United States Patent [19]

Pawloski et al.

[11] Patent Number: 4,734,443

[45] Date of Patent: Mar. 29, 1988

[54] POLYURETHANES WITH MONO-OL/DIOL HALONEOCARBYL POLYETHERS AND THEIR ESTERS

[75] Inventors: Chester E. Pawloski, Bay City; Sally P. Ginter, Sanford; David J. Wampfler, Midland, all of Mich.

[73] Assignee: The Dow Chemical Company, Midland, Mich.

[21] Appl. No.: 854,189

[22] Filed: Apr. 21, 1986

[51] Int. Cl.$^4$ .................... C08G 18/00; C08G 18/14
[52] U.S. Cl. ................................ 521/171; 521/906; 528/76
[58] Field of Search .............................. 521/171, 906

[56] References Cited

U.S. PATENT DOCUMENTS

| | | | |
|---|---|---|---|
| Re. 24,514 | 8/1958 | Hoppe et al. | 521/172 |
| 1,922,459 | 8/1933 | Schmidt et al. | 560/263 |
| 2,846,048 | 8/1958 | Brochhagen et al. | 198/320 |
| 2,871,219 | 1/1959 | Baggett et al. | 524/343 |
| 2,891,073 | 6/1959 | Smith | 549/229 |
| 3,058,921 | 10/1962 | Pannell | 549/516 |
| 3,215,652 | 11/1965 | Kaplan | 521/160 |
| 3,402,169 | 9/1968 | Jackson | 536/18.4 |
| 3,755,212 | 8/1973 | Dunlap et al. | 521/174 |
| 3,821,130 | 6/1974 | Barron et al. | 521/133 |
| 3,849,146 | 11/1974 | Walters et al. | 96/107 |
| 3,928,299 | 12/1975 | Rosenkranz et al. | 525/293 |
| 3,933,693 | 1/1976 | Priest et al. | 521/171 |
| 4,083,825 | 4/1978 | Albright et al. | 524/144 |
| 4,260,514 | 4/1981 | Foucht | 521/171 |
| 4,264,745 | 4/1981 | Foucht | 521/171 |
| 4,275,171 | 6/1981 | Wegner | 521/171 |
| 4,298,709 | 11/1981 | Ginter et al. | 521/169 |
| 4,363,882 | 12/1982 | Wegner | 521/171 |
| 4,365,026 | 12/1982 | Pawloski et al. | 521/168 |

FOREIGN PATENT DOCUMENTS 1002530 12/1976 Canada .
898306 6/1962 United Kingdom .

OTHER PUBLICATIONS

ANSI/ASTM D-2863-77 (1977).
ANSI/ASTM E-84.
California Technical Bulletin 117, State of California (Jan., 1980).
Kirk–Othmer Encyclopedia of Chemical Technology, 9, 853–54, Interscience Publishers (1966).
Kirk–Othmer Encyclopedia of Chemical Technology, 18, 633–45 (1982) Interscience Pub.
Kirk–Othmer Encyclopedia of Chemical Technology, 19, 249–50, Interscience Publishers (1982).
Saunders et al., *Polyurethanes*, I; II, Interscience Publishers (1963).
Kohler et al., *J. Am. Chem. Soc.*, 49, 3181–88 (1927).
Schick, M. J., *Nonionic Surfactants*, Marcel Dekker, New York (1967).
Siggia, *Quantitative Organic Analysis via Functional Groups*, 2nd Ed., John Wiley & Sons, Inc., New York (1954) pp. 8–20, 60–63.

*Primary Examiner*—Harold D. Anderson
*Assistant Examiner*—Dennis R. Daley

[57] ABSTRACT

Included are mondiol haloneocarbyl polyethers and their esters incorporated in polyurethane foams. The compositions have haloneocarbyl moieties, and in general, the polyethers before the incorporation in the polyurethanes contain from one to two hydroxy moieties. The polyurethane foam compositions are flame-retardant and can have little or no scorch and little or no odor.

22 Claims, No Drawings

POLYURETHANES WITH MONO-OL/DIOL HALONEOCARBYL POLYETHERS AND THEIR ESTERS

FIELD

The invention relates to polyurethanes with hydroxyated halogenated ethers and their esters.

BACKGROUND

Certain halogenated polyethers are known. They generally have useful flame-retardant properties.

For example, Gibbons et al., Canadian Patent No. 1,002,530 (1976), disclose certain trihaloneopentyl glycol ethers. These ethers are disclosed to be useful as flame-retardant plasticizers, for example, with polyvinyl chloride and are disclosed to have good thermal and decomposition properties.

What is lacking and what is needed are halogenated polyol ethers and their esters with good physical properties and with high flame-retardant capability, low odor, thermal stability and scorch resistance, especially in polyurethane foams.

SUMMARY

The invention comprises mondiol haloneocarbyl polyethers and their esters incorporated in polyurethane foams. These polyethers generally contain from about one to about two hydroxy moieties which react with the polyurethane-forming components such as isocyanate moieties and also contain the haloneocarbyl moiety. Their esters generally contain from one to two ester moieties and can contain both hydroxy and ester moieties.

The compositions of the invention are useful for flame-retardant polyurethanes. The compositions preferably have high flame-retardant capability and little or no odor and scorch.

ILLUSTRATIVE EMBODIMENTS

The invention can employ the mondiol haloneocarbyl polyethers. These polyethers generally contain from about one to about two hydroxy moieties. The term generally means of reasonable inclusion because preparation of these polyethers may result in a limited proportion of haloneocarbyl polyether molecules which do not have one (i.e., mono-ol) or two (i.e., diol) hydroxy moieties. For example, a small amount of a triol may be present in the mondiol haloneocarbyl polyethers. In view of this and in view of the fact that these polyethers may be a mixture of the mono-ol and diol varieties, the term "mondiol" is used herein to reflect the nature of the haloneocarbyl polyethers.

The term polyether means that generally at least one ether linkage is present per molecule, preferably more than one in a representative sample. In the representative sample of the mondiol haloneocarbyl polyethers, functional analysis such as by elemental and infrared spectral analyses in conjunction with esterification procedures, for example, acetylation with acetic anhydride, phthalic anhydride or a pyridine and acetic anhydride mixture to determine hydroxyl functionality, optionally, with a method involving hydroiodic acid to determine certain ether linkages. See, e.g., Siggia, *Quantitative Organic Analysis via Functional Groups*, 2nd Ed., John Wiley & Sons, Inc., New York (1954) pp. 8-20, 60-63, mass spectroscopy and nuclear magnetic resonance (i.e., NMR) spectroscopy based on protons (i.e., PMR) and the $^{13}C$ isotope (i.e., $^{13}C$-NMR) shows the presence of at least one ether linkage, on average, per molecule.

Preferably, these polyethers include mondiol haloneocarbyl polyethers of the general formula:

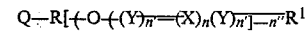

wherein

Q—R is a haloneocarbyl moiety or hydro(oxyhaloneocarbyl) moiety; $R^1$ is separately at each occurrence hydrogen or $C_{1-20}$ organic moiety;

X is separately at each occurrence halogen-containing 1,1,2,2-tetra-substituted ethoxy;

Y is separately at each occurrence 1,1,2,2-tetra-substituted ethoxy (not containing halogen);

n is an integer from zero to about 20;

n' is an integer from zero to about 20; and n" is a number from one to about 20, with the proviso that n and n' are not both zero, and if n+n' is one, n" is greater than one.

Halogens herein include fluorine, chlorine and bromine. Preferred halo moieties herein are chloro and bromo.

These polyethers contain the haloneocarbyl moiety or a hydro(oxyhaloneocarbyl) moiety, preferably the hydro(oxyhaloneocarbyl). The haloneocarbyl moiety herein is a saturated halogenated hydrocarbon moiety which contains a quaternary (i.e., 4°) carbon. The 4° carbon is covalently bonded to four other separate carbons. The haloneocarbyl moiety is incorporated with the the remaining part of these polyethers via an ether linkage from a methylene carbon bonded to the 4° carbon. The hydro(oxyhaloneocarbyl) moiety is a haloneocarbyl moiety which additionally contains hydroxy (OH) functionality or oxy functionality (i.e., ether) which ultimately is bonded to a group with hydroxy functionality. These compounds are thus cogeneric.

Haloneocarbyl and hydro(oxyhaloneocarbyl) moieties generally include moieties of the formula:

wherein

Q is either halogen, preferably bromo, (generally with the haloneocarbyl moiety), or hydroxy or the ether ultimately bonded to a group with hydroxy functionality (with the hydro(oxyhaloneocarbyl) moiety); and $R^2$ is separately at each occurrence hydrogen, hydroxy or halogen, preferably hydrogen or bromo and more preferably bromo.

The most preferred neocarbyl R moieties are nominally 2,2-bis(bromomethyl)propyl and 2,2-bis(bromomethyl)-3-hydroxypropyl.

$R^1$ may be hydrogen or a $C_{1-20}$ attached organic or attached inorganic moiety. The attached $R^1$ moieties are attached by reaction with the 1-oxy functionality of Y, preferably as a Y-OH functionality or Y-OR$^1$ functionality, when $R^1$ is dealkylatable alkyl (e.g., tertiary carbon, such as may be found when Y is reacted with a compound such as t-butylglycidyl ether, which may later be dealkylated to hydroxy functionality as desired by reaction with an acid such as $H_3PO_4$ or an aryl sulfonic acid; see, e.g., Ginter et al., U.S. Pat. No. 4,298,709 (1981), (incorporated herein by reference).

$R^1$ may be a $C_{1-20}$ hydrocarbyl moiety. $C_{1-20}$ hydrocarbyl means a moiety that contains from one to about 20 carbons, at least one hydrogen and no other elements. The $C_{1-20}$ hydrocarbyl moiety may be aromatic or aliphatic, which may be unsaturated or saturated and may be straight-chained, branched, alicyclic or combinations thereof, or the $C_{1-20}$ hydrocarbyl moiety may be a combination of aromatic and aliphatic moieties.

$R^1$ may be a $C_{1-20}$ halocarbyl moiety. Halocarbyl means that halogens are separately substituted for all the hydrogens of a hydrocarbyl moiety.

$R^1$ may be $C_{1-20}$ halogenated hydrocarbyl. Halogenated hydrocarbyl means that a halogen has been substituted for a hydrogen in the $C_{1-20}$ moiety, but at least one hydrogen is bonded to a carbon of the moiety.

$R^1$ may be $C_{1-20}$ hydroxyated hydrocarbyl. Hydroxyated hydrocarbyl means that a hydroxy group has been substituted for a hydrogen in the $C_{1-20}$ moiety, but at least one hydrogen is bonded to a carbon of the moiety.

$R^1$ may be $C_{1-20}$ hydroxyated halocarbyl. Hydroxyated halocarbyl means that hydroxy and halogen has been substituted for all the hydrogens of a hydrocarbyl moiety.

$R^1$ may be $C_{1-20}$ halogenated-hydroxyated hydrocarbyl. Halogenated-hydroxyated hydrocarbyl means that together hydroxy and independent halogen have been substituted for at least two hydrogens in the $C_{1-20}$ moiety, but at least one hydrogen is bonded to a carbon of the moiety.

$R^1$ may additionally contain other ether functionality. The ether functionality may be part of a straight, branched or cyclic moiety. More than one such ether functionality may be present.

Preferably, $R^1$ is separately at each occurrence hydrogen, $C_{1-10}$ hydrocarbyl, $C_{1-10}$ halogenated-monohydroxyated hydrocarbyl, $C_{1-10}$ halogenated hydrocarbyl, $C_{1-6}$ mono-hydroxyated hydrocarbyl or $C_{1-6}$ halocarbyl. More preferably, R is hydrogen or is an aromatic, alkenyl, cycloalkenyl, alkyl, cycloalkyl moiety or combination thereof variant of said preferred $C_{1-10}$ and $C_{1-6}$ $R^1$ moieties.

Most preferably, $R^1$ is hydrogen or dealkylatable $C_{1-10}$ alkyl. It is especially preferred that $R^1$ is hydrogen, including when present after dealkylation of the dealkylatable $C_{1-10}$ alkyls.

X is separately at each occurrence halogen-containing 1,1,2,2-tetra-substituted ethoxy. X includes moieties of the formula:

$$-(CX^1X^2-CX^3-O)- \quad (C)$$
$$\phantom{-(CX^1X^2-C}|$$
$$\phantom{-(CX^1X^2-}CX^4$$

wherein
$X^1$, $X^2$ and $X^3$ are each separately hydrogen, $C_{6-20}$ aryl, $C_{7-20}$ arylalkyl or alkylaryl, or $C_{1-20}$ alkyl, preferably hydrogen; and $X^4$ is $C_{1-20}$ halogenated hydrocarbyl, preferably bromomethyl or chloromethyl.

The halogen-containing 1,1,2,2-tetra-substituted ethoxy moieties are preferably remnants of the corresponding halogenated oxiranes. For example, preferred halogenated oxiranes include epichlorohydrin, epibromohydrin, 2,4,6-tribromophenyl glycidyl ether and allyl glycidyl ether which is subsequently brominated with elemental bromine. Most preferred is epichlorohydrin.

Y is separately at each occurrence 1,1,2,2-tetra-substituted ethoxy (not containing halogen). Y includes moieties of the formula:

wherein $Y^1$, $Y^2$, $Y^3$ and $Y^4$ are each separately $R^1$; the preferred oxy moiety being on the number one carbon of the Y moiety. The 1,1,2,2-tetra-substituted ethoxy moieties are preferably remnants of the corresponding 1,1,2,2-tetra-substituted oxiranes which are known or can be prepared by known methods. A preferred method is the epoxidation of the corresponding 1,1,2,2-tetra-substituted ethylene by electrophilic epoxidation agents such as m-chloroperoxy benzoic acid, trifluoro peracetic acid (for F groups) and $H_2O_2$ in conjunction with $Na_2WO_4 \cdot 2H_2O$.

Preferred are Y moieties wherein $Y^1$, $Y^2$, $Y^3$ and $Y^4$ are separately each occurrence hydrogen or $C_{1-4}$ alkyl, hydroxyalkyl or $C_{2-6}$ oxygen (ether) substituted alkenyl. Preferred Y moieties are also separately each occurrence moieties such as 1-methoxyethoxy, 1-methylethoxy and ethoxy. Also, moieties such as 1-methylaloxy and methylphenoxy are preferred Y moieties.

More preferably, n is separately each occurrence from one to about 15, most preferably from one to 5. More preferably, each n' is separately each occurrence from one to about 15. Most preferably, the sum of each n' is about 20 or less. More preferably, n'' is from one to about 5, most preferably from one to 4. In addition, n'' should generally be about 2–2.25 or higher, for example about 6.25 in the case of X being the remnant of epichlorohydrin and the hydro(oxyhaloneocarbyl) moiety being the 2,2-bis(bromomethyl)-3-hydroxypropyl moiety. The lower limit of n'' typically insures a homogeneous liquid product and the upper limit is preferably about 20, in general.

The mondiol haloneocarbyl polyethers are preferably prepared by contacting the hydroxy compounds with the oxiranes corresponding to the oxirane remnants X and Y under conditions sufficient to prepare the mondiol haloneocarbyl polyethers. Additional moieties may be reacted, especially as noted herein. These polyethers are typically cogeneric mixtures.

A preferred method of preparing these polyethers is by the general method taught by Jackson, U.S. Pat. No. 3,402,169 (1968) (incorporated herein by reference), at columns 2–13. Preferably a catalyst is present. Preferred catalysts are Lewis acids such as boron trifluoride ethyl etherate (i.e., $BF_3$-etherate). Preferably, an inert solvent is present. Preferred solvents are halogenated alkanes such as chloroform and methylene chloride. Preferably, the reaction is quenched by the addition of base or lowering the temperature, more preferably by base addition such as by adding 5 percent NaOH (aqueous). The following preferred sequence is illustrative:

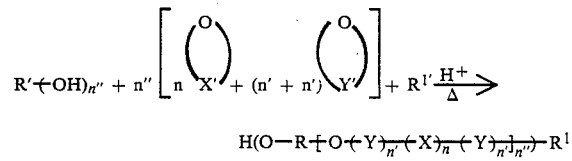

wherein R'—, —X'—, —Y'— and $R^1$, indicate corresponding residues of precursors to HO—R, X, Y and $R^1$. Preferred amounts of reactants are the stoichiometric amounts of each precursor to HO—R, X and Y, and R¹ as desired.

Preferred temperatures overall are from about 0° C. to about 150° C. More preferred temperatures are from about 25° C. to about 120° C. Temperatures of the preparation of the mondiol haloneocarbyl polyethers such as from the precursors to R, R¹, X and Y in the formula are typically in the lower portions of the preferred ranges, preferably such as about 100° C. or below, more preferably about 70° C. or below and most preferably about 40° C. or below. Temperatures of any subsequent steps such as distillations or removal of solvent which are desired are typically in the higher portions of the preferred ranges, preferably such as about 40° C. or above, more preferably about 70° C. or above and most preferably about 100° C. or above.

Preferred mondiol haloneocarbyl polyethers have ethers have halogen contents of about 40 percent by weight or greater.

The mondiol haloneocarbyl polyethers can be random. These can be obtained by generally simultaneous contact with two or more different oxiranes.

It can be advantageous to react the precursors in sequence to obtain the desired polyether. Such sequentially reacted polyethers are commonly referred to as block polyethers. For example, one R precursor and two X precursors may be reacted, and one Y precursor is then reacted with the nominal R—(X)—₂ adduct to prepare a nominal R—(X)₂(Y)— adduct. The word "nominal" is used to indicate that the sequentially reacted compositions are also typically cogeneric.

Especially preferred block mondiol haloneocarbyl polyethers include those such as the following nominal block mono-ol polyethers:

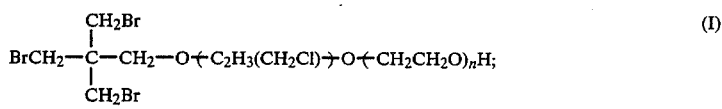

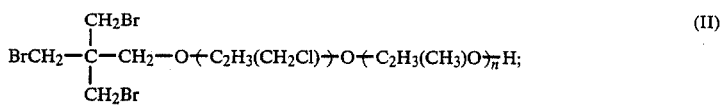

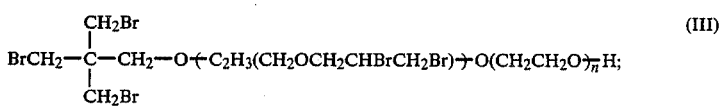

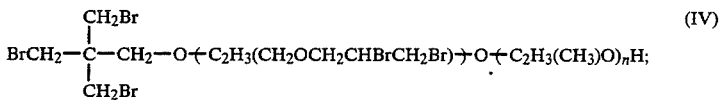

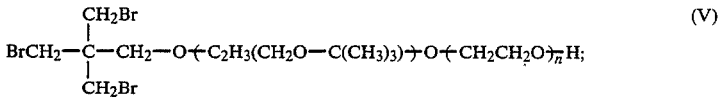

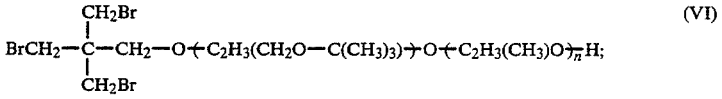

molecular weights of from about 300 a.m.u. to about 50,000 a.m.u., most preferably from about 300 a.m.u. to about 800 a.m.u. It is also preferred that these polywherein n is from 1 to 3, preferably 2, and those such as the following nominal block diol polyethers:

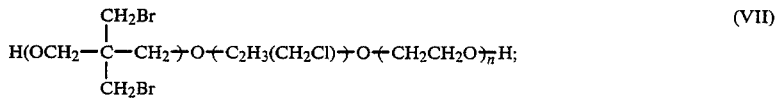

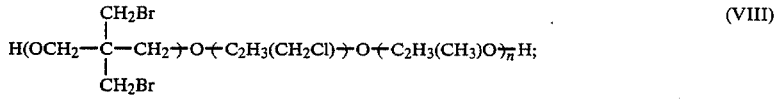

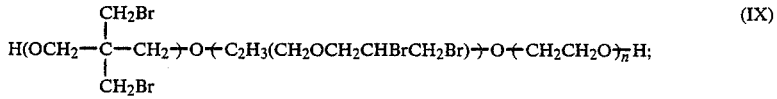

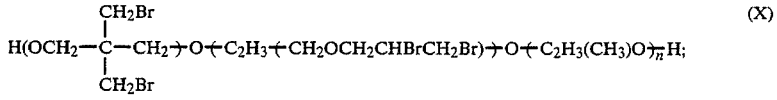

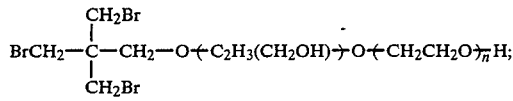

(XI)

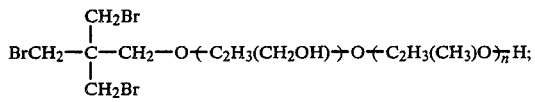

(XII)

wherein n is from 1 to 3, preferably 2. Most preferably, these block polyethers include the nominal block monool haloneocarbyl polyether III and the nominal block diol haloneocarbyl polyether VII.

Preferably, the mondiol haloneocarbyl polyethers are liquids at room temperature and have low viscosity. One preferred method to measure the viscosity is by Brookfield viscometer, which is measured at 25° C. The Brookfield viscosity is measured herein with a number 6 spindle submersed with sample in a vessel of a width at least 125 percent the diameter of the spindle. The number of spindle revolutions per minute is 100. Preferred values of the Brookfield viscosity are, in units of centipoise (cP), about 200,000 cP or below, more preferably about 25,000 cP or below and most preferably about 5,000 cP or below. It is especially preferred that the viscosity is about 2,000 cP or below, more especially about 1000 cP or below.

To obtain the especially preferred viscosities, the reaction may be stopped at a low molecular weight composition. Preferably, the especially low viscosity compositions are formed in stoichiometric molar ratios of R:X:Y of from 1:1:2 to 1:1:3, more preferably about 1:1:2. Also preferably therein, Y is a two or three carbon moiety, more preferably three. Examples of preferred Y precursors for this purpose include ethylene oxide and propylene oxide. Examples of preferred X precursors for this purpose include epichlorohydrin and epibromohydrin. Also, block polyethers with epichlorohydrin and ethylene oxide are preferred for this purpose.

Also, dealkylatable $R^1$ groups attached and subsequently dealkylated provide low viscosity mondiol haloneocarbyl polyethers because less cross-linking may occur during preparation. Thus, another preferred $R^1$ group is a group such as from t-butylglycidyl ether.

The following four tables generally illustrate the mondiol haloneocarbyl polyethers. Table I generally illustrates random, and Table II generally illustrates blocked, mondiol haloneocarbyl polyethers with the nominal formula:

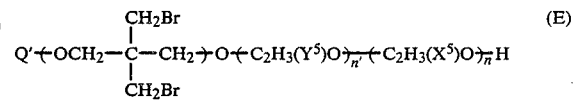

wherein n, n', Q', $X^5$ and $Y^5$ are as follows.

TABLE I

| Q' | $Y^5$ | n' | $X^5$ | n | MW | % Br | % Cl | BV |
|---|---|---|---|---|---|---|---|---|
| H | H | 1 | — | 0 | 306 | 52.3 | — | 4,000 |
| H | H | 2 | — | — | 350 | 45.7 | — | 1,700 |
| H | H | 2 | — | 0 | 350 | 45.7 | — | 2,500 |
| H | H | 2 | — | 0 | 350 | 45.7 | — | 1,700 |
| H | $CH_3$ | 1 | — | 0 | 320 | 50.0 | — | 7,500 |
| H | $CH_3$ | 1.25 | — | 0 | 335 | 47.8 | — | 5,500 |
| H | $CH_3$ | 2 | — | 0 | 378 | 42.3 | — | 2,500 |
| H | $CH_3$ | 3 | — | 0 | 436 | 36.7 | — | 1,400 |
| H | $CH_2Cl$ | 1 | — | 0 | 355 | 45.1 | 10.0 | 13,500 |
| H | $CH_2Cl$ | 1.24 | — | 0 | 377 | 42.5 | 11.5 | 8,000 |
| H | $CH_2Cl$ | 1.38 | — | 0 | 389 | 41.0 | 12.4 | 17,000 |
| H | $CH_2Cl$ | 2 | — | 0 | 447 | 35.8 | 15.9 | 13,000 |
| H | $CH_2Cl$ | 3 | — | 0 | 540 | 29.7 | 19.7 | 9,300 |
| H | $CH_2Br$ | 1 | — | 0 | 399 | 60.2 | — | 15,000 |
| H | $CH_2O$—2,3-diBrPr | 1 | — | 0 | 536 | 59.7 | — | 34,000 |
| H | $CH_2OCH_2CH_2Br$ | 1 | — | 0 | 443 | 54.2 | — | 17,000 |
| H | $CH_2OCH_3$ | 1 | — | 0 | 350 | 45.7 | — | 6,500 |
| H | $CH_3$ | 1 | H | 1 | 364 | 44.0 | — | 2,000 |
| H | $CH_2Cl$ | 1 | H | 1 | 398 | 40.2 | 8.9 | 3,000 |
| H | $CH_2O$—2,3-diBrPr | 1 | $CH_3$ | 1 | 594 | 53.9 | — | 17,000 |
| H | $CH_2O$—2,3-diBrPr | 2 | $CH_3$ | 2 | 652 | 49.1 | — | 9,000 |
| H | $CH_2O$—2,4,6-triBrPh | 1 | H | 2 | 737 | 54.3 | — | 68,000 |
| H | $CH_2O$—2,4,6-triBrPh | 1 | $CH_3$ | 1 | 707 | 56.6 | — | |

TABLE II

| Q' | $Y^5$ | n' | $X^5$ | n | MW | % Br | % Cl | BV |
|---|---|---|---|---|---|---|---|---|
| H | $CH_3$ | 1 | H | 1 | 364 | 44.0 | — | 1,800 |
| H | $CH_2Cl$ | 1 | H | 1 | 398 | 40.2 | 8.9 | 5,000 |
| H | $CH_2Br$ | 1 | H | 1 | 443 | 54.2 | — | 7,500 |
| H | $CH_2O$—2,6-diBr-4-MePh | 1 | $CH_3$ | 2 | 763 | 52.4 | — | 29,000 |
| H | $CH_2O$—2,3-diBrPr | 1 | H | 1 | 580 | 55.2 | — | 22,000 |
| H | $CH_2O$—2,3-diBrPr | 1 | H | 2 | 624 | 51.3 | — | 11,000 |

Table III generally illustrates blocked mondiol haloneocarbyl polyethers with the nominal formula

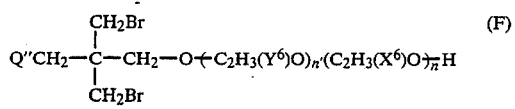

wherein n, n', Q'', $X^6$ and $Y^6$ are as follows.

TABLE III

| Q'' | $Y^6$ | n' | $X^6$ | n | % Br + Cl | $TGA_{10}$ | $TGA_{50}$ | BV |
|---|---|---|---|---|---|---|---|---|
| Br | $CH_2OH$ | 1 | $CH_3$ | 1 | — | | | 8,000 |
| Br | $CH_2O$—2,3-diBrPr | 1 | $C_2H_5$ | 1 | — | | | 7,000 |
| Br | $CH_2Cl$ | 1 | $CH_3$ | 1 | — | | | 1,400 |
| Br | $CH_2Cl$ | 1.25 | $CH_3$ | 1 | 57.0 | 202 | 286 | 1,500 |
| Br | $CH_2Cl$ | 2 | $CH_3$ | 1 | 54.8 | 223 | 326 | 3,100 |
| Br | $CH_2Cl$ | 2 | — | — | 61.0 | 223 | 319 | 3,300 |

The mondiol haloneocarbyl polyethers can be advantageously prepared with a blend of halogenated alcohols, for example, haloneocarbyl alcohols such as 2,2-bis(bromomethyl)-1,3-propanediol and 3-bromo-2,2-bis(bromomethyl)propanol. This blending preferably results in a low viscosity liquid which can easily be incorporated as a flame-retardant into commercial polyurethane foams, for example. Table IV generally illustrates such blended mondiol haloneocarbyl polyethers with the Q' and Q'' neocarbyl moiety components, such as listed for formulae E and F, for example, prepared with a blend of these haloneocarbyl alcohols by weight.

TABLE IV

| Q''/Q' | $Y^5$ | n' | $X^5$ | n | % Br | % Cl | MW | BV |
|---|---|---|---|---|---|---|---|---|
| Br/H[1] | H | 2 | — | — | 52.6 | — | 550 | 600 |
| " | $CH_3$ | 2 | — | — | 48.7 | — | 594 | 650 |
| " | H | 1 | $CH_2Cl$ | 1 | 46.2 | 9.2 | 634 | 1,200 |
| " | * | 1 | H | 1 | 59.6 | — | 919 | 6,500 |

[1]Br/H is a 80/20 blend
*$CH_2O$—2,3-diBrPr

The esters of the mondiol haloneocarbyl polyethers are mondiol haloneocarbyl polyethers in which at least one active hydrogen of the mondiol haloneocarbyl polyether is generally considered substituted by a carbonyl moiety. The carbonyl moiety can be represented by the general formula $$\underset{\|}{\overset{O}{-CR^a}}$$

(i.e., —C(O)$R^a$) wherein $R^a$ is an organic moiety, preferably of about 20 carbons or less.

Thus, the Q or $R^1$ such as of the mondiol haloneocarbyl polyether formula A can be the carbonyl moiety with these esters. Other carbonyl moieties can also be present as an ester moiety, for example, such as esterified on the appropriate Y moiety of formula D within said polyether formula A.

The $R^a$ organic moiety is also preferably hydrocarbyl, halohydrocarbyl or oxygen-substituted (preferably, ether) hydrocarbyl or halohydrocarbyl. Most preferably, the $R^a$ organic moiety is aliphatic, especially $C_{2-4}$ alkyl, for example, acetyl.

In general, the presence of the carbonyl moiety as ester can "cap" or "block" an otherwise active hydrogen of a hydroxyl moiety. When fully esterified, these esters of the mondiol haloneocarbyl polyethers are thus generally considered to be additive type flame retardants in substances such as the foamed polyurethanes.

Table V generally illustrates these esters. In Table V, the formula F is referenced, and the resultant mondiol haloneocarbyl polyether is fully acetate capped.

TABLE V

| Q'' | $Y^6$ | n' | $X^6$ | n | % Br + Cl | $TGA_{10}$ | $TGA_{50}$ | BV |
|---|---|---|---|---|---|---|---|---|
| Br | $CH_2Cl$ | 2 | — | — | 56.4 | 219 | 313 | 1900 |
| Br | $CH_2Cl$ | 2 | $CH_3$ | 1 | 50.9 | 222 | 315 | 1100 |

In each of Tables I, II, III, IV and V, the MW is the theoretical molecular weight; the percent Br and percent Cl are the weight percent of bromine and chlorine, respectively, as determined by elemental analysis; and the BV is the Brookfield Viscosity at 25° C. with a number 6 spindle at 100 rpm. The TGA10 and TGA50 values, reported in ° C., are from thermogravimetric analysis as illustrated herein. Also, $CH_2O$-2,3-diBrPr is $CH_2OCH_2CHBrCH_2Br$; $CH_2O$-2,4,6-triBrPh is

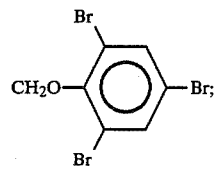

and $CH_2O$-2,6-diBr-4-MePh is

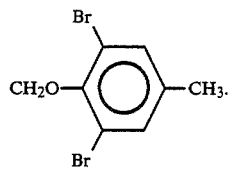

The esters of mondiol haloneocarbyl polyethers can be prepared by processes somewhat analogous to generally known processes. For example, a process such as reacting an acylating agent with the mondiol haloneocarbyl polyether under conditions sufficient to prepare the corresponding ester(s) can be employed to prepare the esters of mondiol haloneocarbyl polyethers.

The acylating agent can be one such as an acyl halide (i.e., $R^aC(O)Hal$), for example, acetyl chloride. Preferred conditions therewith include employment of an acid scavenger such as a base, for example, dropwise addition of pyridine or aqueous sodium carbonate.

The acylating agent can be one such as an acyl acid or anhydride (i.e., $R^aC(O)OH$; $R^aC(O)O(O)CR^{a'}$, respectively, wherein $R^a$ is $R^a$ or other organic moiety, preferably $R^a$), for example, acetic acid or acetic anhydride. Preferred conditions therewith include removal of water or acid, respectively. The esterification is preferably acid catalyzed.

Purification of the ester product can be achieved, if desired, by known methods such as chromatography and distillation. Distillation is preferably included.

Preferably, the mondiol haloneocarbyl polyethers and their esters have high thermal stability. One preferred method to measure this is by thermogravimetric analysis (i.e., TGA), where the sample tested is continuously monitored for weight loss as its temperature is progressively increased in an oven with a nitrogen atmosphere. Preferably, the progressive temperature increase is at a rate of 20° C. per minute from an initial temperature of 20° C. with the sample size initially between 0.010 g and 0.020 g. Under these preferred test conditions, TGA's preferably have at 50 percent weight loss of sample (i.e., $TGA_{50}$) a temperature of about 200° C. or above, more preferably about 250° C. or above and most preferably about 280° C. or above. It is especially preferred that the $TGA_{50}$ is about 300° C. or above, more especially about 320° C. or above.

As a flame retardant, these polyethers and their esters are added in any amount which is effective to lower the combustibility of the otherwise more flammable polyurethane foam to any degree. By flame-retardant is meant that the mondiol haloneocarbyl polyether or its ester when incorporated in the more flammable material reduces the propensity of the more flammable material (e.g., polyurethane) to propagate combustion after the removal of a small scale ignition source such as a lit Bunsen burner.

Any amount of these polyethers or their esters which is flame-retardant is suitable for this invention. Preferably, flame-retardant amount of these polyethers and their esters are between about 5 and 100 parts by weight of the composition, for example, of polyahl of a foamed polyurethane, most preferably between about 10 and 50 parts by weight.

When incorporated into a rigid polyurethane foam, such as an insulating foam, preferred measures of the flame-retardant capability include the Steiner tunnel test of ASTM E-84 or the equivalent such as Underwriter's Laboratories (i.e., UL) 723. It is preferred that the rigid foam pass the E-84 test or equivalent with a Class II rating or better. It may be desired to incorporate into the flame-retardant composition an amount effective to secure a Class I rating. Other tests such as the German DIN-4102-B2 test or its Swiss counterpart may be used.

When incorporated into a flexible polyurethane foam as a flame retardant, a preferred measure of the flame-retardant composition is the California 117 test such as in California Technical Bulletin 117, State of California, Department of Consumer Affairs, Bureau of Home Furnishings, North Highlands, Calif. (Jan., 1980) (incorporated herein by reference). It is preferred that the California 117 test is passed by the flame-retardant flexible foam composition.

Preferably, the flame-retardant agent with the foamed polyurethanes, especially the flexible foams and most especially slabstock, show high scorch resistance. By scorch resistance is meant resistance to discoloration. Preferably, the scorch-resistant flame-retardant foamed polyurethane composition shows by the Gardner Colorimeter test a $\Delta E$ in National Bureau of Standards (i.e., NBS) units of about 10 or below, more preferably about 6 or below and most preferably about 4 or below in comparison to the material without the composition and otherwise the same (i.e., a control sample). See Albright et al., U.S. Pat. No. 4,083,825 (1978) (incorporated herein by reference) at column 8, line 58 to column 11, line 23. The mondiol haloneocarbyl polyethers and their esters with better thermal stability typically show higher scorch resistance.

The foamed polyurethanes of this invention comprise organic polyisocyanates, polyahls and flame-retarding amounts of the mondiol haloneocarbyl polyethers. Alternatively, the mondiol haloneocarbyl polyethers or their hydroxy-containing esters, preferably the diols, may be the polyahls polymerized with the organic polyisocyanates to form polyurethanes. However, this latter alternative is not preferred. Thus, mondiol haloneocarbyl polyethers and their esters are preferably employed in combination with other polyahls commonly employed in the art.

The term polyahl includes any organic compound having at least two active hydrogen moieties and an average molecular weight of at least about 60. For the purpose of this invention, an active hydrogen moiety refers to a moiety containing a hydrogen atom which, because of its position in the molecule, displays significant activity according to the Zerewitnoff test such as described by Kohler et al., *J. Am. Chem. Soc.*, 49, 3181-88 (1927). Illustrative of such active hydrogen moieties are —COOH, —OH, $NH_2$, =NH, $CONH_2$, SH and —CONH—. Typical polyahls include polyols, polyamines, polyamides, polymercaptans, polyacids and the like, particularly as exemplified by Rosenkranz et al. in U.S. Pat. No. 3,928,299 (1975) (incorporated herein by reference).

Of the foregoing polyahls, the polyols are preferred. Examples of such polyols useful in this invention are other polyol polyethers, the polyol polyesters, hydroxy functional acrylic polymers, hydroxy-containing epoxy resins, polyhydroxy terminated polyurethane polymers, polyhydroxy-containing phosphorus compounds and alkylene oxide adducts of compounds such as polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxy group. Also alkylene adducts of compounds which contain one —SH group and one —OH group as well as those which contain an amino group and a —SH group may be used.

Any of the mondiol haloneocarbyl polyethers or their esters, and optionally another polyahl can be contacted with an organic polyisocyanate to form desired polyurethane products using conventional polyurethane reaction conditions and procedures. Such reaction and procedures are optionally carried out in the presence of chain extending agents, catalysts, surface active agents, stabilizers, blowing agents, fillers and/or pigments. In the preparation of foamed polyurethane, suitable procedures for the preparation of same are disclosed by Hoppe et al. in U.S. Pat. No. Re 24,514 (reissued 1958) (incorporated herein by reference). Preferred methods include those such as taught by Jackson, U.S. Pat. Nos. 3,402,169 (1968), by Ginter et al., 4,298,709 (1981) and by Pawloski et al., 4,365,026 (1982) (each incorporated herein by reference). When water is added as the blowing agent, corresponding quantities of excess isocyanate to react with the water and produce carbon dioxide may be used. Instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride and methylene chloride may be used as blowing agents. However, water is preferred.

The preparation of the foamed polyurethane plastics can proceed by a prepolymer technique wherein an excess of organic polyisocyanate is reacted in a first step with the mondiol haloneocarbyl polyether or the appropriate ester thereof and optionally another polyahl to prepare a prepolymer having free isocyanate groups which is then reacted in a second step with blowing agent to prepare a foam. Alternatively, the components may be reacted in a single working step commonly known as the "one-shot" technique.

The foams can also be prepared by the froth technique such as described by Dunlap et al. in U.S. Pat. Nos. 3,755,212 (1973); by Barron et al. in 3,821,130 (1974); and by Walters et al. in 3,849,146 (1974) (each incorporated herein by reference).

Other polyether polyols which are advantageously employed in the practice of this invention are other polyalkylene polyether polyols including other polymerization products of alkylene oxides and other oxiranes with water or polyhydric alcohols having from two to eight hydroxy groups. Exemplary alcohols that are advantageously employed in making the polyether polyols (and mondiol haloneocarbyl polyethers) include ethylene glycol, 1,3-propylene glycol, 1,2-propylene glycol, 1,4-butylene glycol, 1,3-butylene glycol, 1,2-butylene glycol, 1,5-pentanediol, 1,7-heptanediol, glycerol, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known as bisphenol A. Oxiranes that may be advantageously employed in the preparation of the polyether polyols (and mondiol haloneocarbyl polyethers and their esters) include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide tetrahydrofuran copolymers; epihalohydrins such as epichlorohydrin; as well as aralkylene oxides such as styrene oxide. The polyalkylene polyether polyols may have primary, secondary or tertiary hydroxy groups and, preferably, are polyethers prepared from alkylene oxides having from two to six carbon atoms such as ethylene oxide, propylene oxide and butylene oxide. The other polyalkylene polyether polyols may be prepared by any known process such as, for example, the process disclosed in *Kirk-Othmer Encyclopedia of Chemical Technology*, 18, 633-45; 19, 249-50, published by Interscience Publishers, Inc. (1982), or by Schmidt et al. in U.S. Pat. No. 1,922,459 (1933) (incorporated herein by reference). Also suitable are other polyether polyols and processes for preparing such as those described by Smith in U.S. Pat. No. 2,891,073 (1959); by Pannell in U.S. Pat. No. 3,058,921 (1962) and by Baggett et al. in U.S. Pat. No. 2,871,219 (1959) (each incorporated herein by reference). Other polyether polyols which are most preferred include the alkylene oxide addition products of water, trimethylolpropane, glycerine, pentaerythritol, sucrose, sorbitol, propylene glycol and blends thereof having hydroxy equivalent weights of from about 250 to about 5000.

Organic polyisocyanates which can be employed include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenylmethane triisocyanate, polymethylene polyphenylisocyanate and tolylene-2,4,6-triisocyanate; and the tetraisocyanates such as 4,4'-dimethyldiphenylmethane-2,2', 5,5'-tetraisocyanate. Especially useful due to their availability and properties are tolylene diisocyanate, diphenyl-methane-4,4'-diisocyanate and polymethylene poly-phenylisocyanate.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. Preferred undistilled or crude isocyantes include those such as disclosed by Kaplan in U.S. Pat. No. 3,215,652 (1965) (incorporated herein by reference).

Chain-extending agents which can be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water such as phenylenediamine, bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)ethylenediamine. Nonetheless, water is preferred.

The urethane reaction of polyisocyanate with the mondiol haloneocarbyl polyethers, the appropriate esters thereof and optionally other polyahls is advantageously carried out in the presence of an amount of a urethane-type catalyst which is effective to catalyze the reaction of the hydroxy group with the polyisocyanate. Preferably, the amount of urethane catalyst is an amount comparable to that used in conventional urethane-type reactions.

Any suitable urethane catalyst can be used including tertiary amines, such as, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-dimethyl-N', N'-methyl isopropyl propylene diamine, N,N-diethyl-3-diethylaminopropylamine, dimethyl benzylamine and the like. Other suitable catalysts include, for example, tin compounds such as stannous chloride, tin salts of carboxylic acids such as stannous octate dibutyltin di-2-ethyl hexanoate, as well as other organometallic compounds such as are disclosed by Brochhagen et al. in U.S. Pat. No. 2,846,048 (1958) (incorporated herein by reference).

A wetting agent(s) or surface-active agent(s) is generally necessary for production of high grade polyurethane foam according to the present invention, since in the absence of same, the foams may collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liqud organosilicones have been found particularly desirable. Other surface-active agents which are operative, although not as preferred, include polyethylene glycol ethers of long chain alcohols, tertiary amine or alkylolamine salts of long chain alkyl acid sulfate esters, alkyl sulfonic esters and alkyl arylsulfonic acids.

SPECIFIC EMBODIMENTS

The following examples further illustrate the invention. All percentages are by weight unless otherwise indicated.

Examples 1 and 2 illustrate preparation of the mondiol haloneocarbyl polyethers and their esters. Examples 3–4 illustrate mondiol haloneocarbyl polyethers and their esters such as incorporated with polyurethane foams.

EXAMPLE 1—PREPARATION OF RANDOM HYDRO-(OXYHALONEOCARBYL) POLYETHER

Into a flask are placed 26.2 g of 2,2-bis(bromomethyl)-1,3-propanediol (0.1 mole) and 100 ml chloroform. The mixture is heated until a solution is obtained, and then 1 ml of $BF_3$-etherate is added. To this mixture is added dropwise, with stirring, a mixture of 57 g of allyl glycidyl ether (0.1 mole) and 8.8 g 1,2-ethylene oxide (0.1 mole) in 50 ml of chloroform. The resultant mixture is stirred until the reaction is complete, whereupon the mixture is cooled to ice-water temperature, and 16 g elemental bromine (0.1 mole) is added dropwise, with stirring. Upon completion of this reaction, some aqueous sodium carbonate is stirred in, followed by a little water. The organic phase is separated, dried over sodium sulfate, filtered, and the solvent is removed by evaporation with gentle heating to yield an oil (56 g; 90 percent of theory) with a Brookfield Viscosity (number 6 spindle; 100 rpm; 25° C.) of 2,000 cP with the following general formula:

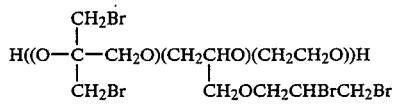

EXAMPLE 2—PREPARATION OF BLOCKED HALO-NEOCARBYL POLYETHER ESTER

A. Preparation of the Polyether

One mole of 3-bromo-2,2-bis(bromomethyl)propanol is reacted with 2 moles of epichlorohydrin by the general procedure of Example 1. Upon completion of this reaction, 1 mole of propylene oxide is then reacted by the general procedure of Example 1. The product is purified by the general procedure of Example 1 to yield the polyether with the general formula

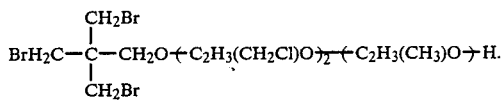

B. Esterification

A 240-g sample of the polyether as from Part A of the example (0.42 mole) is stirred with 240 g of acetic anhydride (1 mole) and at 140° C. -150° C. for 8 hours. The more volatile components are removed under reduced pressure, and the resultant mixture is allowed to cool to room temperature.

Next, 200 ml of methylene chloride and 100 ml of water are stirred in. The product layer (organic phase) is separated and is stirred with 100 ml of dilute aqueous sodium carbonate. The resultant product layer is separated, is dried over sodium sulfate, is filtered, and the solvent is removed by distillation to yield the ester as an oil (255 g) at 99 percent theoretical yield with Brookfield viscosity (number 6 spindle; 100 rpm; 25° C.) of 1100 cP. MW: 610 amu. Elemental analysis: 39.3 percent Br; 11.6 percent Cl. The ester is of the general formula

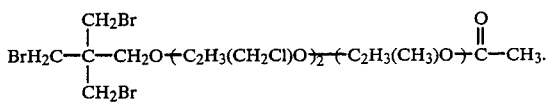

EXAMPLE 3

A flexible polyurethane foam is prepared as follows with the ester of Example 2. The following post cure results are observed.

The A-side (i.e., isocyanate side) of the formulation is weighed out. The A-side is 103.8 g of toluene diisocyanate.

The B-side (i.e., polyol side) of the formulation is weighed out as follows: 200 g of polyol with a molecular weight of about 3,000 and hydroxy number of about 53.4 (Voranol ® 3137, trademark of The Dow Chemical Company), 14 g of the esterified mondiol haloneocarbyl polyether of Example 2, 8 g of deionized water, 10 g of methylene chloride, 2 g of silicone surfactant (Q2-5125 ®, trademark of Dow Corning Corp., Midland, Mich.), 0.44 g of amine catalyst (NIAX ™ A-1, available from Union Carbide) and 0.9 g of stannous octoate catalyst (T-10, available from M&T Chemical Co.).

The B-side components are combined and mixed at 1,000 rpm (i.e., rotations per minute of the stirrer) for 10 seconds. The A-side is quickly added, and the A-B mixture is mixed at 1,000 rpm for 5 seconds and poured into a clean $10\times10\times6$-inch$^3$ ($25.4\times26.4\times15.2$ cm$^3$) cardboard box prior to creaming. Within the next 1 to 4 hours, the foam is placed in an oven at 200° F. (93.3° C.) to cure for 20 minutes.

The foam has a density of 1.48 pcf (i.e., pound per cubic foot) (23.7 kg per cubic meter). The foam has an air flow value of 4.5 cfm (i.e., cubic feet per minute) (0.13 cubic meters per minute).

Next, the foam is subjected to the general testing method such as the California Vertical Burn test, and it passes the requirements with average burn length of 3.1 inches (i.e., 7.9 cm). The foam exhibits essentially no scorch and it has substantially no odor.

EXAMPLE 4

A rigid polyurethane foam is prepared as follows. The following post cure results are observed.

The A-side (i.e., isocyanate side) of the formulation is weighed out. The A-side is 104.9 pounds (47.59 kg) of polymeric diphenylmethane diisocyanate with isocyanate functionality of approximately 2.7 (Mondur® MR, available from Mobay).

The B-side (i.e., polyol side) of the formulation is weighed out as follows: 43.18 pounds (19.59 kg) of a polyol with a typical hydroxy number of 446 (Voranol® 446 from The Dow Chemical Company); 45 pounds (20 kg) of an aromatic polyester polyol with a hydroxy number of approximately 315 (Terate® 203 from Hercules Chemical); 11.82 pounds (5.361 kg) of a mondiol haloneocarbyl polyether which is prepared with FR-1138® from The Dow Chemical Company (a blend containing approximately 85 percent 2,2-bis(bromomethyl)-1,3-propanediol; 10 percent 3-bromo-2,2-bis(bromomethyl)propanol; 5 percent 3-bromo-2,2-bis(hydroxymethyl)propanol) and ethylene oxide in a FR-1138 to ethylene oxide mole ratio of 1:2 by the general procedure of Example 1; 42.035 pounds (8.6485 kg) of $CCl_3F$ (Freon® 11, E. I. duPont de Nemours & Co., Wilmington, Del.); 2 pounds (907.2 g) of silicone surfactant (Dow Corning 193, Dow Corning Corp., Midland, Mich.), 0.75 pound (340 g) of dimethylcyclohexylamine (Polycat® 8 amine catalyst, Abbot Labs, Chicago, Ill.); 2.5 pounds (1.1 kg) of a Freon® compatibilizer (Antiblaze® 80, trischloroisopropyl phosphate, Albright & Wilson or Surfonic® N-95, Texaco).

The B-side components are combined in a clean 55-gallon (210-liter) drum. The drum is rolled to obtain a homogeneous mixture.

The A-side and B-side are combined with a high pressure (90 pound per square inch; 620 kPa) Admiral impingement mixing head, and the A-B mixture is thus deposited into a vertical panel mold with surface heating. The mold is 8 feet (2.44 meters) in vertical height; 2 feet, 4 inches (71.1 cm) in width and 4½ inches (11.4 cm) in depth.

The setting time is approximately 20 to 25 minutes. The foam is next allowed to age for 2 days, whereupon the depth of the panel is trimmed to 4 inches (10.16 cm) by trimming one side. Next, the width of the panel is trimmed to 2 feet (60.96 cm) by trimming one side. The trimmed panel is allowed to season for 4 weeks at ambient conditions indoors. The seasoned panel has a density of about 2.2 pounds per cubic foot (35 kg per cubic meter).

The seasoned panel is subjected to the Steiner (25 foot; 7.62 meter) tunnel test of ASTM E-84. The seasoned panel passes the Class I requirements with FS (flame spread) value of 25 and smoke value of 205.

We claim:

1. A flame-retardant, substantially non-scorching polyurethane foam prepared using a composition comprising an organic polyisocyanate, a polyahl and a flame-retarding amount of a mondiol haloneocarbyl polyether or an ester capped derivative of such polyether, said mondiol haloneocarbyl polyether being represented by the general formula:

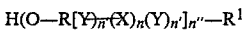

wherein

HO—R is a hydro(oxyhaloeocarbyl) moiety;

$R_1$ is separately at each occurrence hydrogen or $C_{1-20}$ organic moiety;

X is separtely at each occurrence halogen-containing 1,1,2,2-tetra-substituted ethoxy;

Y is separately at each occurrence 1,1,2,2-tetra-substituted ethoxy not containing halogen;

n is an integer from zero to about 20;

n' is an integer from zero to about 20; and n'' is separately at each occurrence a number from one to about 20.

2. The foam of claim 1 wherein the polyurethane is a flexible foam.

3. The foam of claim 2 having a scorch resistance ΔE value by the Gardner Colorimeter test of 6.0 or below.

4. The foam of claim 3 wherein the scorch resistance ΔE value by the Gardner Colorimeter test is 4.0 or below.

5. The foam of claim 3 which passes the California Vertical burn test.

6. The foam of claim 1 wherein the polyurethane is a rigid foam.

7. The foam of claim 6 wherein the rigid foam passes the Class II flame spread requirements of ASTM E-84.

8. The foam of claim 7 which passes the Class I flame spread requirements of ASTM E-84.

9. The foam of claim 1 wherein the mondiol haloneocarbyl polyether before incorporation into the polyuretahne has a Brookfield viscosity of about 200,000 cps or less.

10. The foam of claim 9 wherein the viscosity is about 20,000 or less.

11. The foam of claim 10 wherein the viscosity is about 5,000 or less.

12. The foam of claim 1 wherein the halogen of X is bromine or chlorine.

13. The foam of claim 12 wherein the halogen of R is bromine or chlorine.

14. The foam of claim 13 wherein $R^1$ is hydrogen or a dealkylatable hydrocarbon moiety.

15. The foam of claim 14 wherein the halogen of X is bromine.

16. The foam of claim 15 having a viscosity of about 200,000 cps or below.

17. The foam of claim 16 having a viscosity of about 20,000 cps or below.

18. The foam of claim 17 having a viscosity of about 5,000 cps or below.

19. The foam of claim 1 wherein at least one hydroxyl is esterified.

20. The foam of claim 19 wherein the esterified moiety is of the formula $—C(O)R^a$ wherein Ra is $C_{2-4}$ alkyl.

21. The foam of claim 1 wherein the mondiol haloneocarbyl polyether is selected from the group consisting of:

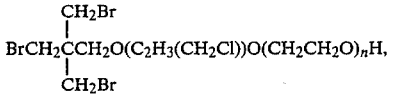

-continued $$BrCH_2\underset{\underset{CH_2Br}{|}}{\overset{\overset{CH_2Br}{|}}{C}}CH_2O(C_2H_3(CH_2Cl))O(C_2H_3(CH_3)O)_nH,$$

$$BrCH_2\underset{\underset{CH_2Br}{|}}{\overset{\overset{CH_2Br}{|}}{C}}CH_2O(C_2H_3(CH_2OCH_2CHBrCH_2Br))O(CH_2CH_2O)_nH,$$

$$BrCH_2\underset{\underset{CH_2Br}{|}}{\overset{\overset{CH_2Br}{|}}{C}}CH_2O(C_2H_3(CH_2OCH_2CHBrCH_2Br))O(C_2H_3(CH_3)O)_nH,$$

$$BrCH_2\underset{\underset{CH_2Br}{|}}{\overset{\overset{CH_2Br}{|}}{C}}CH_2O(C_2H_3(CH_2OC(CH_3)_3))O(CH_2CH_2O)_nH, \text{ and}$$

$$BrCH_2\underset{\underset{CH_2Br}{|}}{\overset{\overset{CH_2Br}{|}}{C}}CH_2O(C_2H_3(CH_2OC(CH_3)_3))O(C_2H_3(CH_3)O)_nH.$$

22. The foam of claim 1 wherein the mondiol haloneocarbyl polyether is selected from the group consisting of:

$$HOCH_2\underset{\underset{CH_2Br}{|}}{\overset{\overset{CH_2Br}{|}}{C}}CH_2O(C_2H_3(CH_2Cl))O(CH_2CH_2O)_nH,$$

$$HOCH_2\underset{\underset{CH_2Br}{|}}{\overset{\overset{CH_2Br}{|}}{C}}CH_2O(C_2H_3(CH_2Cl))O(C_2H_3(CH_3)O)_nH,$$

$$HOCH_2\underset{\underset{CH_2Br}{|}}{\overset{\overset{CH_2Br}{|}}{C}}CH_2O(C_2H_3(CH_2OCH_2CHBrCH_2Br))O(CH_2CH_2O)_nH,$$

$$HOCH_2\underset{\underset{CH_2Br}{|}}{\overset{\overset{CH_2Br}{|}}{C}}CH_2O(C_2H_3(CH_2OCH_2CHBrCH_2Br))O(C_2H_3(CH_3)O)_nH,$$

$$BrCH_2\underset{\underset{CH_2Br}{|}}{\overset{\overset{CH_2Br}{|}}{C}}CH_2O(C_2H_3(CH_2OH))O(CH_2CH_2O)_nH, \text{ and}$$

$$BrCH_2\underset{\underset{CH_2Br}{|}}{\overset{\overset{CH_2Br}{|}}{C}}CH_2O(C_2H_3(CH_2OH))O(C_2H_3(CH_3)O)_nH.$$

* * * * *

UNITED STATES PATENT AND TRADEMARK OFFICE
CERTIFICATE OF CORRECTION

PATENT NO. : 4,734,443

DATED : March 29, 1988

INVENTOR(S) : Chester E. Pawloski, Bay City; Sally P. Ginter, Sanford; David J. Wampfler, Midland, all of Mich.

It is certified that error appears in the above-identified patent and that said Letters Patent is hereby corrected as shown below:

Column 18, line 3, the formula should read
"$H(O-R[Y)_{n'}(X)_n(Y)_{n'}]_{n''})R^1.$"

Column 18, line 7, the word "hydro(oxyhaloeocarbyl)" should read --hydro(oxyhaloneocarbyl)--.

Column 18, line 8, "$R_1$" should be --$R^1$--.

Column 18, line 10, the word "separtely" should be --separately--.

Column 18, line 34, the word "polyuretahne" should be --polyurethane--.

Column 18, line 59, "Ra" should be --$R^a$--.

Signed and Sealed this

Fifteenth Day of November, 1988

*Attest:*

DONALD J. QUIGG

*Attesting Officer*   Commissioner of Patents and Trademarks